United States Patent
Hirata

(10) Patent No.: US 6,730,271 B2
(45) Date of Patent: *May 4, 2004

(54) FUEL-CELL SYSTEM WITH AUTOTHERMAL FUEL-REFORMING APPARATUS INCORPORATING INPUT AIR REGULATION

(75) Inventor: Toshiyuki Hirata, Toyota (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,311

(22) Filed: May 26, 1998

(65) Prior Publication Data

US 2002/0031458 A1 Mar. 14, 2002

(30) Foreign Application Priority Data

Jun. 10, 1997 (JP) .............................. 9-169566

(51) Int. Cl.⁷ .............................. G05D 7/00; B01J 8/00; B01J 8/04
(52) U.S. Cl. ...................... 422/110; 422/105; 422/108; 422/111; 422/188; 422/189; 422/190; 429/22; 429/24
(58) Field of Search ................................. 422/189, 108, 422/110, 211, 187, 188, 191, 194, 190, 111, 105; 423/651, 652, 653, 654; 429/12, 22, 23, 24; 252/373

(56) References Cited

U.S. PATENT DOCUMENTS

| | | | | |
|---|---|---|---|---|
| 4,581,157 A | * | 4/1986 | Twigg | 252/373 |
| 4,620,940 A | * | 11/1986 | Quang et al. | 252/373 |
| 5,368,835 A | * | 11/1994 | Choudhary et al. | 423/651 |

FOREIGN PATENT DOCUMENTS

| | | |
|---|---|---|
| DE | 196 05 404 | 4/1797 |
| DE | 44 23 587 | 1/1996 |
| GB | 1 570 223 | 6/1980 |
| GB | 2 199 841 A | 7/1988 |
| JP | 4-160003 | 6/1992 |

\* cited by examiner

*Primary Examiner*—Jerry D. Johnson
*Assistant Examiner*—Alexa A. Doroshenk
(74) *Attorney, Agent, or Firm*—Oblon, Spivak, McClelland, Maier & Neustadt, P.C.

(57) ABSTRACT

A reformer 34 includes three reforming reaction units 80, 82, and 84. These reforming reaction units 80, 82, and 84 respectively include catalyst layers 81, 83, and 85. A supply of crude fuel gas fed to the reformer 34 successively passes through the catalyst layers 81, 83, and 85 in this sequence to be subjected to reforming reactions and converted to a hydrogen-rich gaseous fuel. An air supply unit 90 feeds a supply of the air to each catalyst layer. Oxidation reactions proceed in addition to the reforming reactions in the catalyst layer which receives the supply of the air. Heat produced by the oxidation reactions is utilized for the reforming reactions. Temperature sensors 86, 87, and 88 respectively measure the internal temperatures of the catalyst layers 81, 83, and 85. The amount of the air fed to each catalyst layer is regulated, based on the results of the measurement.

16 Claims, 5 Drawing Sheets

FUEL-CELL SYSTEM WITH AUTOTHERMAL FUEL-REFORMING APPARATUS INCORPORATING INPUT AIR REGULATION

BACKGROUND OF THE INVENTION

1. Field of the Invention

The present invention relates to a fuel reforming apparatus which converts a hydrocarbon crude fuel to a hydrogen-rich gaseous fuel through a reforming reaction and feeds a supply of the gaseous fuel to fuel cells. The present invention also pertains to a method of the same and a fuel-cells system with the fuel reforming apparatus incorporated therein.

2. Description of the Prior Art

Fuel cells convert the chemical energy of a fuel not via mechanical energy or thermal energy but directly into electrical energy and thereby realize a high energy efficiency. A well-known structure of the fuel cells includes a pair of electrodes arranged across an electrolyte layer. A supply of hydrogen-containing gaseous fuel is fed to one electrode or a cathode, whereas a supply of oxygen-containing oxidizing gas is fed to the other electrode or an anode. The fuel cells generate an electromotive force through electrochemical reactions proceeding on the electrodes. Equations (1) through (3) given below represent electrochemical reactions proceeding in the fuel cells. Equation (1) shows the reaction proceeding at the cathode, whereas Equation (2) shows the reaction proceeding at the anode. The reaction shown by Equation (3) accordingly proceeds as a whole in the fuel cells.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

The fuel cells are classified, for example, by the type of the electrolyte and the driving temperature. An oxidizing gas and a gaseous fuel containing carbon dioxide may be used in polymer electrolyte fuel cells, phosphate fuel cells, and molten carbonate fuel cells, because of their properties of the electrolytes. In these fuel cells, the air is generally used as the oxidizing gas, and the hydrogen-containing gas produced by steam reforming a hydrocarbon crude fuel, such as methanol or natural gas, as the gaseous fuel.

A reformer functioning as the fuel reforming apparatus is incorporated in a fuel-cells system including such fuel cells. The reformer converts the crude fuel into a gaseous fuel through the reforming reactions. By way of example, the following reforming reactions proceed in the reformer to steam reform methanol used as the crude fuel:

$$CH_3OH \rightarrow CO + 2H_2 - 90.0 (kJ/mol) \quad (4)$$

$$CO + H_2O \rightarrow CO_2 + H_2 + 40.5 (kJ/mol) \quad (5)$$

$$CH_3OH + H_2O \rightarrow CO_2 + 3H_2 - 49.5 (kJ/mol) \quad (6)$$

In the process of steam reforming methanol, the decomposition reaction of methanol expressed by Equation (4) proceeds simultaneously with the conversion reaction of carbon monoxide expressed by Equation (5). The reaction of Equation (6) thus occurs as a whole. Since the reaction for reforming the crude fuel is endothermic, an external heating unit, such as a burner or a heater, is attached to the reformer to supply the heat required for the endothermic reforming reaction.

When the heat required for the reforming reaction is supplied externally to the reformer, a large portion of the supply of heat is not used for the reforming reaction but is wasted. This lowers the energy efficiency of the whole system with the reformer. When the hot combustion gas from the burner supplies the heat required for the reforming reaction, for example, the hot combustion exhaust containing a considerable quantity of energy that has not been used for the reforming reaction is wastefully discharged from the reformer. In another example, when the heater is used as the heating unit, a considerable quantity of energy produced by the heater is used not to promote the reforming reactions but to heat a reaction vessel of the reformer.

In the method of supplying heat from the burner or the heater, when the quantity of the reforming reactions (that is, the quantity processed through the reforming reactions) is significantly varied with a significant change in amount of the crude fuel fed to the reformer, it is difficult to keep the internal temperature of the reformer within a desirable temperature range suitable for the reforming reactions and ensure the sufficient activity of the reforming reactions. When the amount of the crude fuel, such as methanol, fed to the reformer is increased to increase the quantity processed through the reforming reactions, the internal temperature of the reformer is lowered with the progress of the endothermic reforming reaction. The temperature decrease results in deactivating the reforming reaction. It may be considered that an increase in quantity of heat supplied from the burner or the heater prevents the temperature decrease in the reformer. This method, however, can not sufficiently follow the temperature variation due to an abrupt increase in quantity processed through the reforming reactions, since there is a limit in rate of heat transfer in the reformer.

When the amount of the crude fuel fed to the reformer is decreased to decrease the quantity processed through the reforming reactions, on the other hand, a decrease in heat consumed by the reforming reactions raises the internal temperature of the reformer. In case that the temperature increase causes the internal temperature of the reformer to exceed the desired temperature range, undesired reactions other than the reforming reactions expressed by Equations (4) through (6) given above proceed in the reformer and cause the gaseous fuel to be contaminated with undesirable products. The excessive increase in temperature of the reformer deteriorates the reforming catalyst included in the reformer and shortens the life of the reformer. It may be considered that a decrease in quantity of heat supplied from the burner or the heater prevents the temperature increase in the reformer. This method, however, can not sufficiently follow the temperature variation due to an abrupt decrease in quantity processed through the reforming reactions, since the reformer itself has a predetermined heat capacity.

Another known method of supplying the heat required for the reforming reaction feeds a supply of oxygen-containing oxidizing gas as well as a supply of the crude fuel to the reformer and causes the exothermic oxidation reaction to proceed with the endothermic reforming reaction in the reformer, in order to supply the heat required for the reforming reaction by the heat produced by the oxidation reaction (for example, JAPANESE PATENT LAYING-OPEN GAZETTE No. 4-160003). A reformer 134 shown in FIG. 5 is an example of such known reformers. The reformer 134 has a reforming reaction unit 180 including a catalyst layer 181. The catalyst layer 181 receives a supply of crude fuel gas containing, for example, methanol and a supply of the air ingested from outside via an air supply unit 190. A temperature sensor 186 is disposed in the catalyst layer 181.

The driving state of a flow control valve 192 located in the air supply unit 190 is controlled, based on the temperature in the catalyst layer 181 measured by the temperature sensor 186. The control of the driving state regulates the amount of the air fed to the catalyst layer 181.

The amount of the air supplied to the catalyst layer 181 is regulated according to the observed temperature of the catalyst layer 181. Regulation of the supply of the air fed to the catalyst layer 181 in order to keep the internal temperature of the catalyst layer 181 within a desired temperature range accordingly makes the heat consumed by the reforming reaction well balance the heat produced by the oxidation reaction and ensures the sufficiently high activity of the reforming reactions proceeding in the reformer 134. In the reformer 134 of this structure, the heat required for the reforming reactions is supplied inside the reformer. This structure effectively reduces the quantity of heat that is not used for the reforming reactions but is wasted, and thereby ensures the high energy efficiency.

In the proposed structure where the oxidation reaction proceeds with the reforming reaction in the reformer, however, it is rather difficult to keep the temperature of the whole reformer in a uniform state in the desired temperature range under the condition of a significant change in quantity processed by the reforming reactions. When the quantity processed through the reforming reactions abruptly increases in the reformer 134, both the supply of the air fed from the air supply unit 190 and the supply of the crude fuel gas abruptly increase. This causes the non-uniform temperature distribution in the catalyst layer 181.

With an increase in amount of the air supplied to the catalyst layer 181, the oxidation reaction proceeds actively and quickly raises the catalyst temperature in an upstream area of the catalyst layer 181 having the high concentration of the air (oxygen), that is, the area close to the surface of the catalyst layer 181 which receives the supply of the air from the air supply unit 190. A downstream area of the catalyst layer 181, that is, the area close to the surface of the catalyst layer 181 which discharges the resulting reformed gas after the reforming reaction, on the other hand, has the low concentration of oxygen since oxygen has been consumed by the oxidation reaction on the upstream side. In the downstream area, the steam reforming reaction actively proceeds in preference to the oxidation reaction and lowers the catalyst temperature. Even when the supply of the air is regulated according to the results of detection of the temperature sensor 186, the catalyst temperature is high on the upstream side and gradually decreases along the flow of the gas in the catalyst layer 181. On the upstream side of the catalyst layer 181, the high temperature may cause production of undesired components by the undesired reactions and deterioration of the catalyst. On the downstream side of the catalyst layer 181, on the other hand, the low temperature may cause the lowered activity of the reforming reactions.

SUMMARY OF THE INVENTION

One object of the present invention is thus to enhance the utilization efficiency of heat in reforming reactions in a method of reforming fuel as well as in a fuel reforming apparatus and a fuel-cells system with the fuel reforming apparatus incorporated therein.

Another object of the present invention is to keep the activity of the reforming reactions at a sufficiently high level even when the quantity processed through the reforming reactions is varied.

At least part of the above and the other related objects is realized by a method of converting a hydrocarbon included in a crude fuel gas to hydrogen through an endothermic reforming reaction. The method includes the steps of:

(a) feeding a supply of the crude fuel gas to a reformer including a plurality of reforming reaction units, in which the reforming reaction proceeds, the supply of the crude fuel gas successively passing through the plurality of reforming reaction units;

(b) detecting a progress of the reforming reaction in each of the plurality of reforming reaction units;

(c) feeding a supply of oxygen to each of the plurality of reforming reaction units to make an exothermic oxidation reaction proceed in each reforming reaction unit, and causing heat produced by the oxidation reaction to be utilized for the reforming reaction; and (d) regulating an amount of oxygen fed to each reforming reaction unit, based on the progress of the reforming reaction detected in each reforming reaction unit.

The present invention is also directed to a fuel reforming apparatus which converts a hydrocarbon included in a crude fuel gas to hydrogen through an endothermic reforming reaction and discharges a gaseous fuel containing the hydrogen. The fuel reforming apparatus includes: a reformer including a plurality of reforming reaction units, each reforming reaction unit having a reforming catalyst, which accelerates the reforming reaction, and an oxidation catalyst, which accelerates an exothermic oxidation reaction in the presence of oxygen; a crude fuel supply unit which feeds a supply of the crude fuel gas to the reformer, so as to cause the supply of the crude fuel gas to successively pass through the plurality of reforming reaction units; a progress detection unit which detects a progress of the reforming reaction in each of the plurality of reforming reaction units; an oxygen supply unit which feeds a supply of oxygen to each of the plurality of reforming reaction units to make the oxidation reaction proceed; and an oxygen supply regulation unit which regulates an amount of oxygen fed to each reforming reaction unit via the oxygen supply unit, based on the progress of the reforming reaction detected by the progress detection unit.

In the method of reforming fuel and the corresponding fuel reforming apparatus of the present invention, the reforming reaction proceeds with the heat produced by the oxidation reaction that proceeds in the plurality of reforming reaction units. This structure effectively reduces the quantity of energy consumed for the supply of heat required for the reforming reaction. The amount of oxygen fed to each reforming reaction unit is regulated by the progress of the reforming reaction in the reforming reaction unit. The progress of the reforming reaction is accordingly kept in a desired state by making the relationship between the quantity of the reforming reaction proceeding in the fuel reforming apparatus and the supply of oxygen satisfy a predetermined condition.

Regulation of the amount of oxygen supplied to each reforming reaction unit enables the progress of the reforming reaction to be kept in the desired state. Even when the quantity of the reforming reaction proceeding in the reformer is varied, this structure effectively prevents troubles due to the local temperature increase or the local temperature decrease in the fuel reforming apparatus. The local excess of oxygen supply in a specific area of the fuel reforming apparatus increases the temperature in the specific area and causes production of undesired by-products and deterioration of the catalyst. The local insufficiency of oxygen supply in a specific area, on the contrary, decreases the temperature in the specific area and lowers the activity of the reforming reaction. In the method of reforming fuel and the corresponding fuel reforming apparatus of the present invention, the progress of the reforming reaction is kept in the desired state by regulating the supply of oxygen. This structure favorably prevents the above problems even when the quantity of the reforming reaction proceeding in the reformer is varied.

Since the progress of the reforming reaction is kept in the desired state in each reforming reaction unit, even when the quantity processed through the reforming reaction is increased, each reforming reaction unit is utilized efficiently to promote the reforming reaction. The fuel reforming apparatus of the present invention does not require an excess of the reforming catalyst and thereby reduces its size.

In accordance with one preferable application of the method, the step (b) includes the step of:

detecting the progress of the reforming reaction in each of the plurality of reforming reaction units, based on an internal temperature of each reforming reaction unit, and the step (d) includes the step of:

regulating the amount of oxygen fed to each reforming reaction unit, in order to keep the internal temperature of each reforming reaction unit in a predetermined temperature range.

In accordance with one preferable application of the fuel reforming apparatus, the progress detection unit detects the progress of the reforming reaction in each of the plurality of reforming reaction units, based on an internal temperature of each reforming reaction unit, and the oxygen supply regulation unit regulates the amount of oxygen fed to each reforming reaction unit, in order to keep the internal temperature of each reforming reaction unit in a predetermined temperature range.

In this preferable structure, the amount of oxygen supplied to each reforming reaction unit is regulated to keep the internal temperature of the reforming reaction unit within the predetermined temperature range. This enables the progress of the reforming reaction to be kept in a desired state and ensures the sufficiently high activity of the reforming reaction.

The present invention is further directed to a fuel-cells system, which includes the fuel reforming apparatus of the present invention and a fuel cell that receives a supply of the gaseous fuel produced by the fuel reforming apparatus and generates electricity.

In the fuel-cells system of this structure, the heat produced by the oxidation reaction is utilized for the reforming reaction in the fuel reforming apparatus. This structure reduces the quantity of energy consumed by the fuel reforming apparatus as the heat required for the reforming reaction and thereby enhances the energy efficiency of the fuel-cells system. Since the progress of the reforming reaction is kept in the desired state in the fuel reforming apparatus, the quantity of the reforming reaction proceeding in the fuel reforming apparatus can be varied with a variation in quantity of power generation in the fuel cells. The reforming catalyst included in the fuel reforming apparatus is utilized at a sufficiently high efficiency, so that the size of the fuel reforming apparatus can be reduced to a sufficient level. These and other objects, features, aspects, and advantages of the present invention will become more apparent from the following detailed description of the preferred embodiment with the accompanying drawings.

DESCRIPTION OF THE PREFERRED EMBODIMENTS

Figure 1:
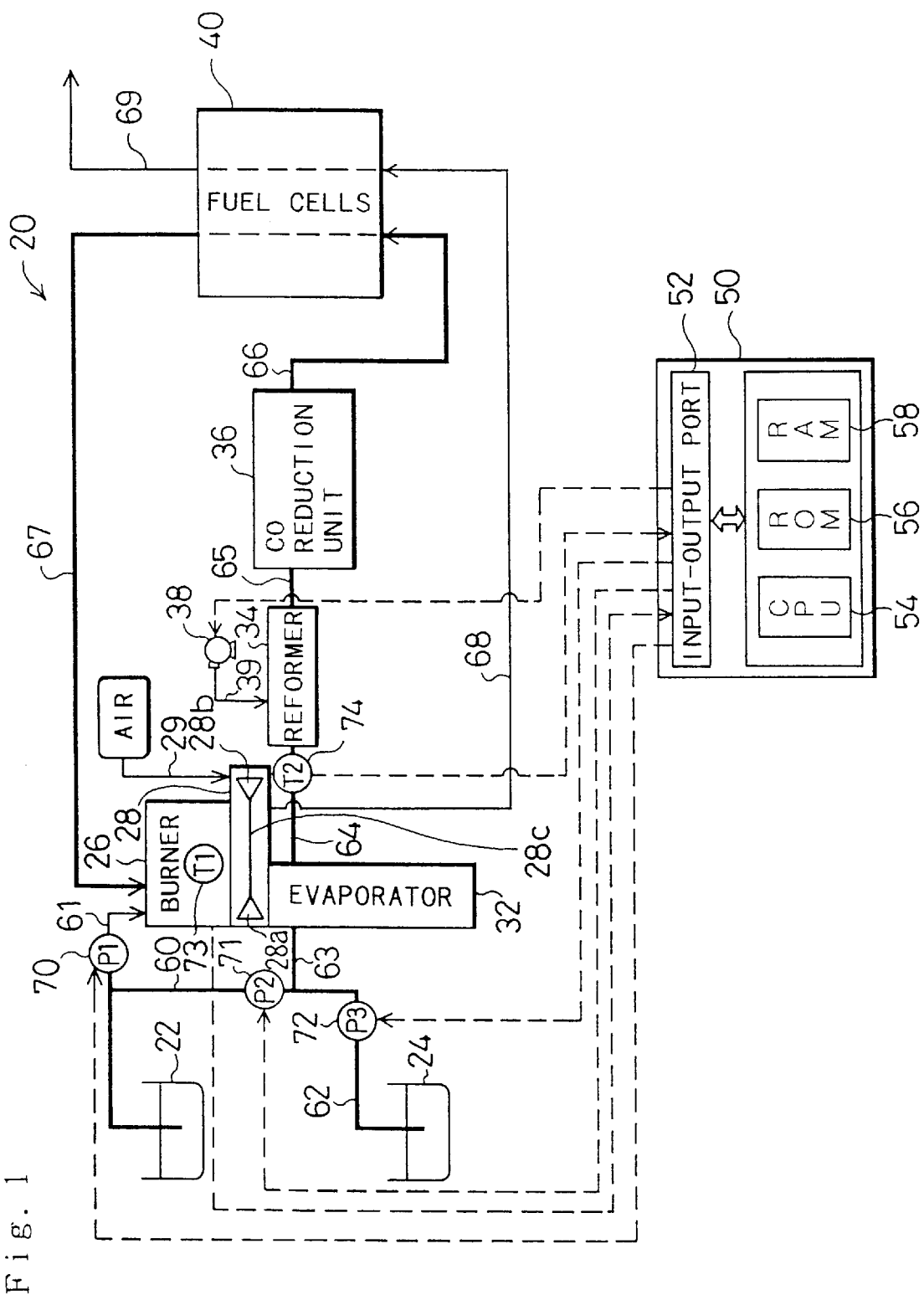
FIG. 1 schematically illustrates structure of a fuel-cells system 20 embodying the present invention.

One mode of carrying out the present invention is described below as a preferred embodiment. FIG. 1 schematically illustrates structure of a fuel-cells system 20 embodying the present invention. The fuel-cells system 20 includes, as essential constituents, a methanol tank 22 which stores methanol, a water tank 24 which stores water, a burner 26 which produces combustion gas, a compressor unit 28 which compresses the air, an evaporator 32 combined with the burner 26 and the compressor unit 28, a reformer 34 which produces a gaseous fuel through the reforming reactions, a CO reduction unit 36 which reduces the concentration of carbon monoxide (CO) included in the gaseous fuel, fuel cells 40 which generate an electromotive force through the electrochemical reactions, and a computer-operated control unit 50. The fuel cells 40 function as the main body of power generation in the fuel-cells system 20.

Figure 2:
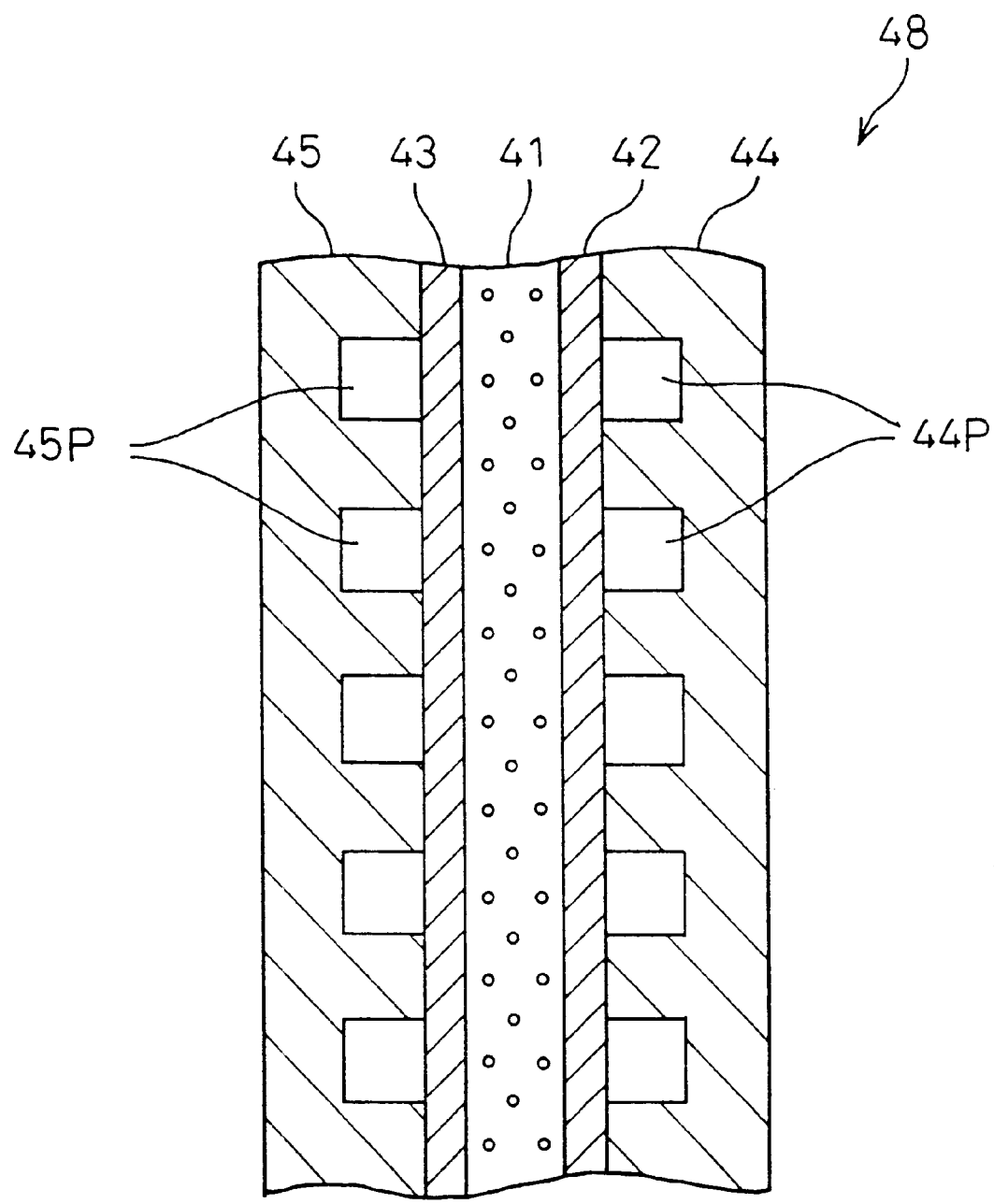
FIG. 2 is a cross sectional view illustrating structure of unit cells 48 constituting a stack of fuel cells 40.

The fuel cells 40 are polymer electrolyte fuel cells and have a stack structure in which a plurality of unit cells are laid one upon another. FIG. 2 is a cross sectional view illustrating structure of unit cells 48 constituting the fuel cells 40. Each unit cell 48 includes an electrolyte film 41, a cathode 42, an anode 43, and separators 44 and 45.

The cathode 42 and the anode 43 are gas diffusion electrodes arranged across the electrolyte film 41 to construct a sandwich-like structure. The separators 44 and 45 are disposed outside the sandwich-like structure and respectively connected to the cathode 42 and the anode 43 to form flow paths of gaseous fuel and oxidizing gas. Flow paths 44P of gaseous fuel are defined by the cathode 42 and the separator 44, whereas flow paths 45P of oxidizing gas are defined by the anode 43 and the separator 45. Although the separators 44 and 45 form the flow paths only on the respective one faces thereof in the drawing of FIG. 2, the separators 44 and 45 actually have ribs on both faces thereof. Each of the separators 44 and 45 is linked with the cathode 42 of one unit cell 48 to define the flow paths 44P of gaseous fuel and with the anode 43 of the adjoining unit cell 48 to define the flow paths 45P of oxidizing gas. The separators 44 and 45 are joined with the gas diffusion electrodes 42 and 43 to form the gas flow paths 44P and 45P, while separating the flow of gaseous fuel from the flow of oxidizing gas between the adjoining unit cells 48. When the unit cells 48 are laid one upon another to constitute the stack structure, the two separators located on both ends of the stack structure may have ribs only on the respective one faces that are in contact with the gas diffusion electrodes.

The electrolyte film 41 is a proton-conductive ion-exchange film composed of a polymer material, such as fluororesin, and shows favorable electrical conductivity in the wet state. In this embodiment, a Nafion film (manufactured by du Pont) is applied for the electrolyte film 41. The surface of the electrolyte film 41 is coated with platinum or a platinum-containing alloy functioning as a catalyst. The technique adopted in this embodiment to apply the catalyst prepares carbon powder with platinum or a platinum-containing alloy carried thereon, disperses the catalyst-carried carbon powder into an appropriate organic solvent, adds a specific amount of an electrolyte solution (for example, Nafion solution manufactured by Aldrich Chemical Corp.) to the dispersion to form a paste, and screen-prints the paste on the electrolyte film 41. Another available technique forms the paste containing the catalyst-carried carbon powder to a sheet and presses the sheet onto the electrolyte film 41.

The cathode 42 and the anode 43 are made of carbon cloth, which is woven of yarns consisting of carbon fibers. Although the cathode 42 and the anode 43 are composed of carbon cloth in this embodiment, carbon paper and carbon felt consisting of carbon fibers are also favorably applicable for the material of the cathode 42 and the anode 43.

The separators 44 and 45 are made of a gas-impermeable conductive material, for example, gas-impermeable, dense carbon obtained by compressing carbon. Each of the separators 44 and 45 has a plurality of ribs formed in parallel on both surfaces thereof. As described previously, each of the separators 44 and 45 is joined with the surface of the cathode 42 of one unit cell 48 to define the flow paths 44P of gaseous fuel and with the surface of the anode 43 of the adjoining unit cell 48 to define the flow paths 45P of oxidizing gas. The ribs formed on the surface of each separator may have any shape that allows supplies of the gaseous fuel and the oxidizing gas to the gas diffusion electrodes, although the ribs are a plurality of grooves formed in parallel in this embodiment. The ribs formed on the respective surfaces of each separator may be arranged at predetermined angles, for example, at right angles.

The separator 44, the cathode 42, the electrolyte film 41, the anode 43, and the separator 45 are laid one upon another in this sequence to constitute each unit cell 48, which is a basic unit of the fuel cells 40. A stack structure is completed by laminating plural sets of these unit cells 48 (100 sets in this embodiment) and disposing current collector plates composed of dense carbon or copper on both ends of the laminate.

The following describes the constituents of the fuel-cells system 20 other than the fuel cells 40 and their connections. The evaporator 32 receives a supply of methanol fed from the methanol tank 22 and a supply of water fed from the water tank 24, and vaporizes the mixture of methanol and water. The evaporator 32 is combined with the burner 26 and the compressor unit 28 as mentioned above. The evaporator 32 receives an exhaust of combustion gas from the burner 26 via the compressor unit 28 as discussed later. The heat of combustion is transmitted to a heat exchanger (not shown) included in the evaporator 32 to boil and vaporize the mixture of methanol and water fed to the evaporator 32.

A methanol flow path 60 for introducing a supply of methanol or the crude fuel from the methanol tank 22 to the evaporator 32 is provided with a second pump 71, which regulates the amount of methanol fed to the evaporator 32. The second pump 71 is connected to the control unit 50 and driven in response to a signal output from the control unit 50, in order to regulate the flow of methanol fed to the evaporator 32.

A water supply path 62 for introducing a supply of water from the water tank 24 to the evaporator 32 is provided with a third pump 72, which regulates the amount of water fed to the evaporator 32. Like the second pump 71, the third pump 72 is connected to the control unit 50 and driven in response to a signal output from the control unit 50, in order to regulate the amount of water fed to the evaporator 32. The methanol flow path 60 and the water supply path 62 join to a first fuel supply path 63, which connects with the evaporator 32. The second pump 71 and the third pump 72 respectively regulate the flow of methanol and the amount of water as described previously. A mixture including a predetermined amount of methanol and a predetermined amount of water is accordingly fed to the evaporator 32 via the first fuel supply conduit 63.

The compressor unit 28 combined with the evaporator 32 compresses the air ingested from the outside of the fuel-cells system 20 and supplies the compressed air to the anodes of the fuel cells 40. The compressor unit 28 includes a turbine 28a and a compressor 28b which are formed as impellers. The turbine 28a and the compressor 28b are connected to each other coaxially via a shaft 28c. Rotation of the turbine 28a is transmitted to drive and rotate the compressor 28b. The burner 26 is also combined with the evaporator 32. The turbine 28a is driven and rotated by the hot combustion gas fed from the burner 26. The compressor 28b rotates with the rotation of the turbine 28a and compresses the air. The air is ingested from the outside via an air inlet path 29 to the compressor 28b. The air compressed by the compressor unit 28 is fed to the fuel cells 40 via an oxidizing gas supply path 68 to be subjected to the electrochemical reactions proceeding in the fuel cells 40.

The turbine 28a, which is driven by the hot combustion gas from the burner 26, is composed of a refractory alloy or ceramics to ensure the sufficient heat resistance and durability. A nickel alloy (Inconel 700 manufactured by Inconel Corp.) is used in this embodiment. The compressor 28b is composed of a light aluminum alloy.

The burner 26 for driving the turbine 28a receives the supplies of fuel for combustion from the cathodes of the fuel cells 40 and the methanol tank 22. The hydrogen-rich gas produced by reforming methanol in the reformer 34 is subjected to the electrochemical reactions proceeding in the fuel cells 40. While part of the hydrogen fed to the fuel cells 40 is consumed by the electrochemical reactions, an exhaust of gaseous fuel containing the remaining hydrogen is discharged to a fuel discharge path 67. The burner 26 is connected to the fuel discharge path 67 to receive the exhaust of gaseous fuel. This enables the remaining hydrogen to be completely combusted and improves the utilization efficiency of the fuel. The fuel exhaust is generally not sufficient for the required amount of the fuel for the combustion reaction in the burner 26. The burner 26 receives a supply of methanol from the methanol tank 22 corresponding to the amount of insufficiency or the whole amount required for the combustion reaction in the burner 26 when no exhaust of gaseous fuel is fed from the fuel cells 40, for example, at the time of starting the fuel-cells system 20. The supply of methanol is fed via a methanol branch path 61 to the burner 26. The methanol branch path 61 branches off the methanol flow path 60 which introduces a supply of methanol from the methanol tank 22 to the evaporator 32.

A first temperature sensor 73, which is attached to the burner 26, measures the temperature of the combustion heat in the burner 26 and inputs the results of the measurement to the control unit 50. The control unit 50 outputs a driving signal to a first pump 70 based on the input from the first temperature sensor 73 and regulates the amount of methanol fed to the burner 26, so as to keep the combustion temperature in the burner 26 in a predetermined range (in a range of approximately 800 to 1000° C.). The combustion gas in the burner 26 is used to drive and rotate the turbine 28a and then led to the evaporator 32. Since the efficiency of heat exchange in the turbine 28a is relatively low (not higher than approximately 10%), the temperature of the combustion exhaust led to the evaporator 32 reaches the level of approximately 600 to 700° C., which is sufficient as the heat source of the evaporator 32. The solution mixture of methanol and water fed via the first fuel supply path 63 is vaporized by means of the hot combustion exhaust led to the evaporator 32. The crude fuel gas including the gaseous mixture of methanol and water vaporized by the evaporator 32 is led through a second fuel supply path 64 to the reformer 34.

The reformer 34 converts the crude fuel gas including the vaporized supplies of methanol and water to hydrogen-rich gaseous fuel through the reforming reactions. Structure of the reformer 34 and the reforming reactions proceeding in the reformer 34 are the essential part of the present invention and will be discussed later in detail. A second temperature sensor 74 is located in the second fuel supply path 64, which introduces the crude fuel gas of methanol and water to the reformer 34, and measures the temperature of the crude fuel gas of methanol and water fed to the reformer 34. The results of measurement regarding the temperature of the crude fuel gas are input into the control unit 50. When outputting the driving signal to the first pump 70 based on the input from the first temperature sensor 73, the control unit 50 corrects the driving amount of the first pump 70 and regulates the amount of methanol fed to the burner 26 based on the input from the second temperature sensor 74. The temperature control of the combustion gas in the burner 26 results in regulating the temperature of the crude fuel gas vaporized by the evaporator 32. The crude fuel gas supplied from the evaporator 32 is generally heated to approximately 250° C.

Oxygen is concerned in the reforming reactions proceeding in the reformer 34 as discussed later. The reformer 34 is accordingly provided with a blower 38, which feeds oxygen required for the reforming reactions. The blower 38 compresses the air ingested from the outside and feeds the compressed air to the reformer 34 via an air supply path 39. The blower 38 is connected to the control unit 50, which controls the driving state of the blower 38.

The CO reduction unit 36 reduces the concentration of carbon monoxide included in the gaseous fuel fed from the reformer 34 via a third fuel supply path 65. The general reforming reactions of methanol are shown by Equations (4) through (6) given above. In the actual state, however, the reforming reactions do not proceed ideally as expressed by these equations, and the gaseous fuel output from the reformer 34 includes a certain amount of carbon monoxide. The CO reduction unit 36 is accordingly disposed to reduce the concentration of carbon monoxide included in the gaseous fuel fed to the fuel cells 40.

The fuel cells 40 of this embodiment are polymer electrolyte fuel cells and have platinum or a platinum-containing alloy carried thereon as the catalyst to accelerate the cell reactions. In this embodiment, the platinum catalyst is applied on the surface of the electrolyte film 41. In case that the gaseous fuel contains a certain amount of carbon monoxide, carbon monoxide is adsorbed by the platinum catalyst to lower its catalytic activity and interferes with the cathode reaction expressed by Equation (1) given above, so as to deteriorate the performance of the fuel cells. In the structure of generating electricity with the polymer electrolyte fuel cells like the fuel cells 40 of this embodiment, it is accordingly essential to reduce the concentration of carbon monoxide included in the supply of gaseous fuel to or below a predetermined level and thereby prevent deterioration of the cell performance. In the polymer electrolyte fuel cells, the allowable limit of the concentration of carbon monoxide included in the supply of gaseous fuel is not greater than several ppm.

The gaseous fuel introduced into the CO reduction unit 36 is the hydrogen-rich gas containing a certain amount of carbon monoxide. The CO reduction unit 36 oxidizes carbon monoxide in preference to hydrogen included in the gaseous fuel. The CO reduction unit 36 is filled with carriers with a selective carbon monoxide-oxidation catalyst carried thereon. Examples of the selective carbon monoxide-oxidation catalyst include platinum, ruthenium, palladium, gold, and a variety of alloys containing any one these metals as the first element. The resulting concentration of carbon monoxide in the gaseous fuel processed by the CO reduction unit 36 depends upon the driving temperature of the CO reduction unit 36, the concentration of carbon monoxide included in the supply of gaseous fuel, and the flow of the gaseous fuel fed to the CO reduction unit 36 per unit volume of the catalyst. A carbon monoxide sensor (not shown) is attached to the CO reduction unit 36. The driving temperature of the CO reduction unit 36 and the flow of the gaseous fuel fed to the CO reduction unit 36 are regulated according to the data of the carbon monoxide sensor, in order to reduce the resulting concentration of carbon monoxide included in the processed gaseous fuel to or below several ppm.

The gaseous fuel having the reduced concentration of carbon monoxide output from the CO reduction unit 36 is led to the fuel cells 40 via a fourth fuel supply path 66 and is subjected to the cell reaction at the cathodes of the fuel cells 40. The exhaust of gaseous fuel after the cell reaction in the fuel cells 40 is discharged to the fuel discharge path 67 and introduced into the burner 26, where hydrogen remaining in the exhaust of gaseous fuel is consumed as the fuel of combustion as described previously. The oxidizing gas concerned in the cell reaction at the anodes of the fuel cells 40 is, on the other hand, fed as the compressed air from the compressor unit 28 via the oxidizing gas supply path 68. The exhaust of oxidizing gas after the cell reaction in the fuel cells 40 is discharged through an oxidizing gas exhaust path 69.

The control unit 50 is constructed as an arithmetic-logic circuit including a microcomputer. More specifically the control unit 50 includes a CPU 54 which executes a variety of operations according to preset control programs, a ROM 56, in which control programs and control data required for the variety of operations executed by the CPU 54 are stored in advance, a RAM 58, which various data required for the variety of operations executed by the CPU 54 are temporarily written in and read from, and an input-output port 52 which receives detection signals from the temperature sensors and outputs driving signals to the pumps and the blower 38 based on the results of the operations by the CPU 54.

Figure 3:
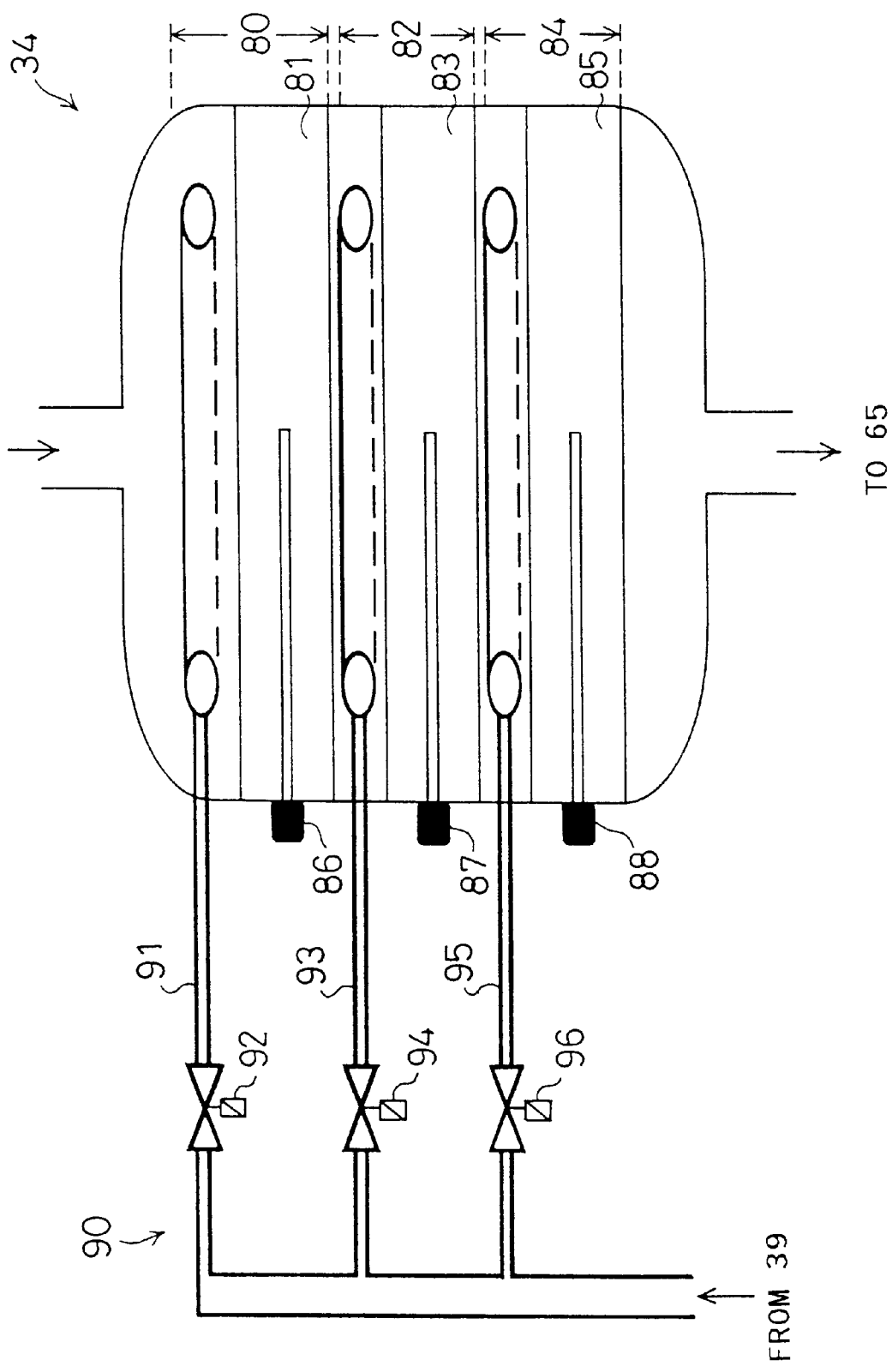
FIG. 3 schematically illustrates structure of a reformer 34.

The following describes the structure of the reformer 34 as the essential part of the present invention. FIG. 3 schematically illustrates structure of the reformer 34. The reformer 34 of this embodiment includes three reforming reaction units laid one upon another, that is, a first reforming reaction unit 80, a second reforming reaction unit 82, and a third reforming reaction unit 84. These reforming reaction units 80, 82, and 84 respectively have a first catalyst layer 81, a second catalyst layer 83, and a third catalyst layer 85. The crude fuel gas fed from the evaporator 32 via the second fuel supply path 64 passes through the first reforming reaction unit 80, the second reforming reaction unit 82, and the third reforming reaction unit 84 in this sequence, is subjected to the reforming reactions proceeding in the catalyst layers 81, 83, and 85 of the respective reforming reaction units 80, 82, and 84, and output as the hydrogen-rich gaseous fuel to the third fuel supply path 65. The respective catalyst layers 81, 83, and 85 included in the reformer 34 of this embodiment are formed to have a large cross section (more concretely, a large cross section perpendicular to the direction of the flow of the gas) and a small thickness along the flow of the gas. The respective catalyst layers 81, 83, and 85 have an identical amount of a composite catalyst including a reforming catalyst and an oxidation catalyst as discussed later. The total amount of the catalyst included in the catalyst layers 81, 83, and 85 is specified to enable a sufficient amount of gaseous fuel to be produced even when the load receiving a supply of electric power from the fuel cells 40 has the expected maximum magnitude.

Each catalyst layer is homogeneously filled with pellets of Cu—Zn catalyst functioning as the reforming catalyst. The pellets of the reforming catalyst are obtained by extruding a mixture of a metal catalyst, which is prepared through coprecipitation of copper and zinc oxide, and a binder, such as alumina, to particles of 3 to 7 mm in diameter. In this embodiment, the platinum catalyst functioning as the oxidation catalyst is further carried on the surface of the pellets of Cu—Zn catalyst. The oxidation catalyst is carried on the surface of the pellets, for example, by impregnating the pellets of Cu—Zn catalyst with a solution containing the platinum catalyst and drying the pellets to deposit the platinum catalyst on the surface of the pellets. The crude fuel gas introduced into the reformer 34 comes into contact with the surface of the catalyst pellets and moves toward the outlet of the reformer 34 connecting to the third fuel supply path 65 with the progress of the reforming reactions and the oxidation reactions. When the Cu—Zn catalyst is used to accelerate the steam reforming reactions, the reaction temperature ensuring the sufficient activity of the reforming reactions ranges from 250 to 300° C.

The reformer 34 is provided with an air supply unit 90, which feeds a supply of oxygen required for the oxidation reactions discussed later to the reformer 34. The air supply unit 90 has air supply branch paths 91, 93, and 95 that branch off the air supply path 39 and respectively introduce the air fed from the blower 38 via the air supply path 39 to the catalyst layers 81, 83, and 85. The air supply branch paths 91, 93, and 95 are wide open on the surface of the upstream side of the respective catalyst layers 81, 83, and 85 having the large cross sections. The air fed from the respective air supply branch paths 91, 93, and 95 is sufficiently mixed with the crude fuel gas, which flows through the reformer 34 with the progress of the reforming reactions, and introduced into the respective catalyst layers 81, 83, and 85. Flow control valves 92, 94, and 96 are disposed respectively in the air supply branch paths 91, 93, and 95. The flow control valves 92, 94, and 96 are solenoid valves connected to the control unit 50. The control unit 50 controls the on-off state of the flow control valves 92, 94, and 96 and regulates the amounts of the air fed to the respective catalyst layers 81, 83, and 85.

Temperature sensors 86, 87, and 88 are disposed in the reforming reaction units 80, 82, and 84. These temperature sensors 86 through 88 are located in the respective catalyst layers 81, 83, and 85 and connected to the control unit 50. The control unit 50 accordingly receives the information regarding the temperatures in the catalyst layers 81, 83, and 85. The control unit 50 controls the on-off state of the flow control valves 92, 94, and 96 and regulates the amounts of the air fed to the respective reforming reaction units 80, 82, and 84, based on the input information regarding the internal temperatures of the catalyst layers 81, 83, and 85.

The following describes the reforming reactions proceeding in the reformer 34 thus constructed. The crude fuel gas including methanol and steam is fed to the Cu—Zn catalyst. In case that the Cu—Zn catalyst is heated to a predetermined temperature, the steam reforming reactions shown by Equations (4) through (6) given above proceed as the endothermic reaction as a whole. In this embodiment, the composite catalyst includes the platinum catalyst functioning as the oxidation catalyst, and the air is added to the supply of crude fuel gas. In this case, the oxidation reactions of methanol proceed in addition to the steam reforming reactions. Oxidation of methanol leads to a variety of reactions, which produce, for example, carbon dioxide, water, and hydrogen. Equation (7) given below shows an example of such reactions:

$$CH_3OH + (\tfrac{1}{2})O_2 \rightarrow CO_2 + 2H_2 + 189.5(kJ/mol) \qquad (7)$$

As clearly understood from Equation (7), the oxidation reactions are exothermic, and the temperature in the catalyst layer increases with the progress of the oxidation reactions. In the reformer 34 of this embodiment, the catalyst layers are heated with the progress of the oxidation reactions, and the steam reforming reactions proceed with the heat produced by the oxidation reactions. The temperature increase in the reformer 34 causes a loss of heat radiation; that is, the heat produced by the oxidation reactions is dissipated out of the reformer 34. The air fed from the blower 38 to the reformer 34 contains a specific amount of oxygen, which corresponds to 10 to 20% of the amount of methanol supplied to the reformer 34. This structure enables the heat produced by the oxidation reactions to balance the heat absorbed by the steam reforming reactions in the reformer 34, while there is the heat dissipation. Namely the heat required for the steam reforming reactions is supplied by the oxidation reactions. The reformer 34 of this embodiment heats the reforming catalyst with the heat produced by the oxidation reactions and keeps the temperature of the reforming catalyst in a temperature range of 250 to 300° C., which is suitable for the reforming reactions.

Figure 4:
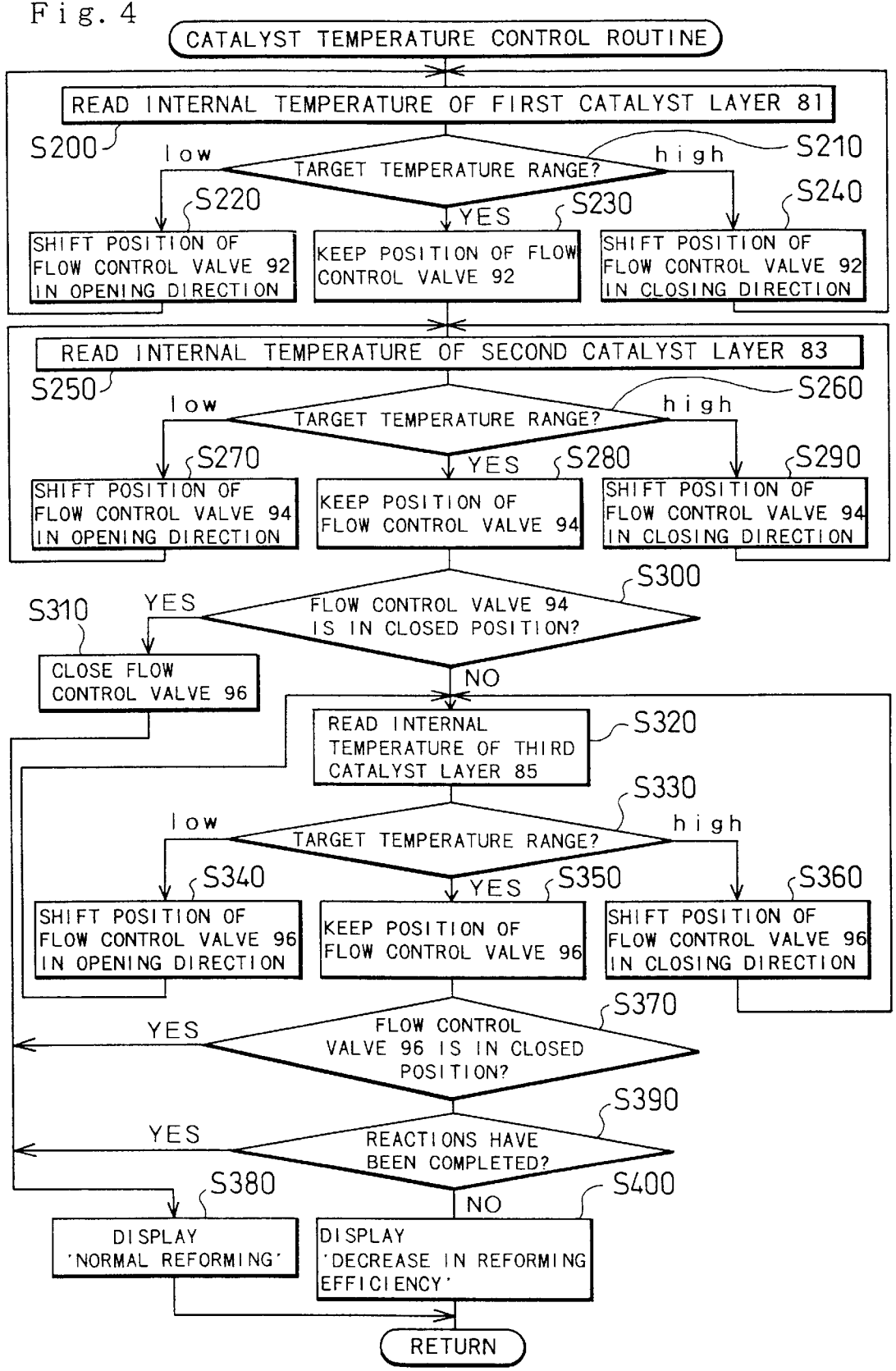
FIG. 4 is a flowchart showing a catalyst temperature control routine executed in the fuel-cells system 20.

The following operation is carried out in the reformer 34 thus constructed. FIG. 4 is a flowchart showing a catalyst temperature control routine executed in the course of the reforming reactions proceeding in the reformer 34. The routine of FIG. 4 is executed at predetermined time intervals in the fuel-cells system 20 after the user presses a predetermined start switch (not shown) and instructs a start of the fuel-cells system 20.

When the program enters the routine of FIG. 4, the CPU 54 first reads the internal temperature of the first catalyst layer 81 from the temperature sensor 86 at step S200, and compares the input internal temperature of the first catalyst layer 81 with a target temperature range of the first catalyst layer 81 at step S210. The target temperature range is specified in advance as the temperature range that ensures the progress of the reforming reactions in the catalyst layer at a sufficient efficiency. In this embodiment, the Cu—Zn catalyst is used as the reforming catalyst, and the target temperature range of the first catalyst layer 81 is 250 to 300° C. In case that the internal temperature of the first catalyst layer 81 is within the target temperature range at step S210, the program determines that the quantity of heat produced by the oxidation reactions well balances the quantity of heat absorbed by the reforming reactions in the first catalyst layer 81 and that the first catalyst layer 81 is kept in the temperature range suitable for the reforming reactions. This means that an appropriate amount of oxygen is fed to the first catalyst layer 81 to the amount of the crude fuel fed to the first catalyst layer 81. The CPU 54 accordingly keeps the position of the flow control valve 92 at step S230.

In case that the internal temperature of the first catalyst layer 81 is below the target temperature range at step S210, the program determines that the degree of the oxidation reactions proceeding in the first catalyst layer 81 is insufficient. This means that an insufficient amount of oxygen is fed to the first catalyst layer 81 to the amount of the crude fuel fed to the first catalyst layer 81. The CPU 54 accordingly shifts the position of the flow control valve 92 in the opening direction at step S220. The change in position of the flow control valve 92 in the opening direction increases the amount of oxygen fed to the first catalyst layer 81 and activates the oxidation reactions, so as to raise the internal temperature of the first catalyst layer 81. After shifting the position of the flow control valve 92 in the opening direction at step S220, the program returns to step S200 to read the internal temperature of the first catalyst layer 81 and proceeds to step S210 to compare the input internal temperature with the target temperature range. The program continues shifting the position of the flow control valve 92 in the opening direction until the internal temperature of the first catalyst layer 81 becomes within the target temperature range.

In case that the internal temperature of the first catalyst layer 81 is above the target temperature range at step S210, on the other hand, the program determines that the degree of the oxidation reactions proceeding in the first catalyst layer 81 is excessive. This means that an excessive amount of oxygen is fed to the first catalyst layer 81 to the amount of the crude fuel fed to the first catalyst layer 81. The CPU 54 accordingly shifts the position of the flow control valve 92 in the closing direction at step S240. The change in position of the flow control valve 92 in the closing direction decreases the amount of oxygen fed to the first catalyst layer 81 and deactivates the oxidation reactions, so as to drop the internal temperature of the first catalyst layer 81. After shifting the position of the flow control valve 92 in the closing direction at step S240, the program returns to step S200 to read the internal temperature of the first catalyst layer 81 and proceeds to step S210 to compare the input internal temperature with the target temperature range. The program continues shifting the position of the flow control valve 92 in the closing direction until the internal temperature of the first catalyst layer 81 becomes within the target temperature range.

When the internal temperature of the first catalyst layer 81 becomes within the target temperature range by the above procedure, the CPU 54 reads the internal temperature of the second catalyst layer 83 from the temperature sensor 87 at step S250 and compares the input internal temperature of the second catalyst layer 83 with a target temperature range of the second catalyst layer 83 at step S260. Like the target temperature range at step S210, the target temperature range of the second catalyst layer 83 is 250 to 300° C. In case that the internal temperature of the second catalyst layer 83 is within the target temperature range at step S260, the program determines that the quantity of heat produced by the oxidation reactions well balances the quantity of heat absorbed by the reforming reactions in the second catalyst layer 83 and that the second catalyst layer 83 is kept in the temperature range suitable for the reforming reactions. This means that an appropriate amount of oxygen is fed to the second catalyst layer 83 to the amount of the crude fuel fed to the second catalyst layer 83. The CPU 54 accordingly keeps the position of the flow control valve 94 at step S280.

In case that the internal temperature of the second catalyst layer 83 is below the target temperature range at step S260, the program determines that the degree of the oxidation reactions proceeding in the second catalyst layer 83 is insufficient. Like the processing at step S220, the CPU 54 accordingly shifts the position of the flow control valve 94 in the opening direction at step S270. The change in position of the flow control valve 94 in the opening direction increases the amount of oxygen fed to the second catalyst layer 83 and activates the oxidation reactions, so as to raise the internal temperature of the second catalyst layer 83. After shifting the position of the flow control valve 94 in the opening direction at step S270, the program returns to step S250 to read the internal temperature of the second catalyst layer 83 and proceeds to step S260 to compare the input internal temperature with the target temperature range. The program continues shifting the position of the flow control valve 94 in the opening direction until the internal temperature of the second catalyst layer 83 becomes within the target temperature range.

In case that the internal temperature of the second catalyst layer 83 is above the target temperature range at step S260, on the other hand, the program determines that the degree of the oxidation reactions proceeding in the second catalyst layer 83 is excessive. Like the processing at step S240, the CPU 54 accordingly shifts the position of the flow control valve 94 in the closing direction at step S290. The change in position of the flow control valve 94 in the closing direction decreases the amount of oxygen fed to the second catalyst layer 83 and deactivates the oxidation reactions, so as to drop the internal temperature of the second catalyst layer 83. After shifting the position of the flow control valve 94 in the closing direction at step S290, the program returns to step S250 to read the internal temperature of the second catalyst layer 83 and proceeds to step S260 to compare the input internal temperature with the target temperature range. The program continues shifting the position of the flow control valve 94 in the closing direction until the internal temperature of the second catalyst layer 83 becomes within the target temperature range.

When the internal temperature of the second catalyst layer 83 becomes within the target temperature range by the above procedure, the CPU54 determines whether or not the flow control valve 94 is in the closed position at step S300. In case that the reforming reactions in the reformer 34 have been completed in the first catalyst layer 81, the flow control valve 94 is kept in the closed position while the internal temperature of the second catalyst layer 83 is within the target temperature range. When the reforming reactions (including the oxidation reactions) have been concluded in the first catalyst layer 81 and the supply of methanol included in the crude fuel gas has been consumed, the resulting gaseous fuel kept within the target temperature range is introduced into the second catalyst layer 83. Further addition of oxygen to the second catalyst layer 83 causes the oxidation reactions to proceed excessively and increases the internal temperature of the second catalyst layer 83. In case that the reforming reactions have been completed in the first catalyst layer 81, the flow control valve 94 is set to the closed position in order to stop the supply of the air to the second catalyst layer 83. This enables the internal temperature of the second catalyst layer 83 to be kept within the target temperature range. In case that the reforming reactions have not yet been completed in the first catalyst layer 81, the steam reforming reactions further proceed in the second catalyst layer 83. The supply of oxygen for the oxidation reactions is accordingly fed to the second catalyst layer 83, in order to produce the heat required for the reforming reactions and keep the internal temperature of the second catalyst layer 83 within the target temperature range.

When the flow control valve 94 is in the closed position at step S300, the program determines that the reforming reactions have been completed in the first catalyst layer 81 as described above, and sets the flow control valve 96 to the closed position at step S310 in order to stop the supply of oxygen to the third catalyst layer 85. Under such conditions, while the reforming reactions have been concluded, the resulting gaseous fuel kept in the target temperature range is led to the third catalyst layer 85 as well as the second catalyst layer 83. The gaseous fuel accordingly passes through the surface of the catalyst without further progress of the reactions. After the flow control valve 96 is set to the closed position at step S310, the program shows a display of 'Normal Reforming' at step S380 and exits from this routine. The display of 'Normal Reforming' may be shown at any place where the user of the fuel-cells system 20 can readily observe. For example, when the fuel-cells system 20 of this embodiment is mounted on the vehicle as the power source for driving the electric vehicle, the display may be shown at a predetermined place in the vicinity of the driver's seat. The display of 'Normal Reforming' may be characters or an icon of a specific design.

When the flow control valve 94 is not in the closed position at step S300, on the other hand, the program determines that the supply of the air is fed to the second catalyst layer 83 and that the oxidation reactions and the steam reforming reactions proceed in the second catalyst layer 83. The CPU 54 then reads the internal temperature of the third catalyst layer 85 from the temperature sensor 88 at step S320 and compares the internal temperature of the third catalyst layer 85 with a target temperature range of the third catalyst layer 85 at step S330. Like the target temperature ranges at steps S210 and S260, the target temperature range of the third catalyst layer 85 is 250 to 300° C. In case that the internal temperature of the third catalyst layer 85 is within the target temperature range at step S330, the program determines that the quantity of heat produced by the oxidation reactions well balances the quantity of heat absorbed by the reforming reactions in the third catalyst layer 85 and that the third catalyst layer 85 is kept in the temperature range suitable for the reforming reactions. This means that an appropriate amount of oxygen is fed to the third catalyst layer 85 to the amount of the crude fuel fed to the third catalyst layer 85. The CPU 54 accordingly keeps the position of the flow control valve 96 at step S350.

In case that the internal temperature of the third catalyst layer 85 is below the target temperature range at step S330, the program determines that the degree of the oxidation reactions proceeding in the third catalyst layer 85 is insufficient. Like the processing at steps S220 and S270, the CPU 54 accordingly shifts the position of the flow control valve 96 in the opening direction at step S340. The change in position of the flow control valve 96 in the opening direction increases the amount of oxygen fed to the third catalyst layer 85 and activates the oxidation reactions, so as to raise the internal temperature of the third catalyst layer 85. After shifting the position of the flow control valve 96 in the opening direction at step S340, the program returns to step S320 to read the internal temperature of the third catalyst layer 85 and proceeds to step S330 to compare the input internal temperature with the target temperature range. The program continues shifting the position of the flow control valve 96 in the opening direction until the internal temperature of the third catalyst layer 85 becomes within the target temperature range.

In case that the internal temperature of the third catalyst layer 85 is above the target temperature range at step S330, on the other hand, the program determines that the degree of the oxidation reactions proceeding in the third catalyst layer 85 is excessive. Like the processing at steps S240 and S290, the CPU 54 accordingly shifts the position of the flow control valve 96 in the closing direction at step S360. The change in position of the flow control valve 96 in the closing direction decreases the amount of oxygen fed to the third catalyst layer 85 and deactivates the oxidation reactions, so as to drop the internal temperature of the third catalyst layer 85. After shifting the position of the flow control valve 96 in the closing direction at step S360, the program returns to step S320 to read the internal temperature of the third catalyst layer 85 and proceeds to step S330 to compare the input internal temperature with the target temperature range. The program continues shifting the position of the flow control valve 96 in the closing direction until the internal temperature of the third catalyst layer 85 becomes within the target temperature range.

When the internal temperature of the third catalyst layer 85 becomes within the target temperature range by the above procedure, the CPU54 determines whether or not the flow control valve 96 is in the closed position at step S370. In case that the reforming reactions in the reformer 34 have been completed in the second catalyst layer 83, the flow control valve 96 is kept in the closed position while the internal temperature of the third catalyst layer 85 is within the target temperature range. When the reforming reactions (including the oxidation reactions) have been concluded in the second catalyst layer 83 and the supply of methanol included in the crude fuel gas has been consumed, the resulting gaseous fuel kept within the target temperature range is introduced into the third catalyst layer 85. Further addition of oxygen to the third catalyst layer 85 causes the oxidation reactions to proceed excessively and increases the internal temperature of the third catalyst layer 85. In case that the reforming reactions have been completed in the second catalyst layer 83, the flow control valve 96 is set to the closed position in order to stop the supply of the air to the third catalyst layer 85. This enables the internal temperature of the third catalyst layer 85 to be kept within the target temperature range.

In case that the flow control valve 96 is in the closed position at step S370, the program determines that the reforming reactions have been completed in the second catalyst layer 83 as described above and proceeds to steps S380 to show the display of 'Normal Reforming' at step S380. The program then exits from this routine.

In case that the flow control valve 96 is not in the closed position at step S370, on the other hand, the program determines that the supply of the air is fed to the third catalyst layer 85 and that the oxidation reactions and the steam reforming reactions proceed in the third catalyst layer 85. The CPU 54 estimates the amount of methanol included in the supply of the crude fuel gas fed to the reformer 34 from the travel of the second pump 71, and estimates the amount of the air fed to the reformer 34 from the driving amount of the blower 38 and the positions of the flow control valves 92, 94, and 96. The CPU 54 then compares the estimated amount of methanol supplied to the reformer 34 with the estimated amount of the air supplied to the reformer 34 and determines whether or not the reforming reactions have been completed in the reformer 34 at step S390. The processing at step S390 is described in detail.

As discussed previously, the internal temperature of each catalyst layer in the reformer 34 is kept within the target temperature range by utilizing the heat produced by the oxidation reactions. It is here considered that oxygen supplied to the reformer 34 is all consumed by the oxidation reactions. Oxidation of methanol leads to a variety of reactions and causes various products. The approximate quantity of heat produced by the oxidation reactions and the approximate amount of methanol consumed by the oxidation reactions can be calculated from the amount of the air supplied to the reformer 34. At step S390, the amount of methanol expected to be used for the steam reforming reactions is calculated from the estimated amount of methanol supplied to the reformer 34 and the calculated amount of methanol consumed by the oxidation reactions. The calculated amount of methanol expected to be used for the steam reforming reactions includes the amount of methanol remaining in the gaseous fuel output from the reformer 34 when the reforming reactions have not been concluded in the reformer 34.

The quantity of heat expected to be consumed by the steam reforming reactions is calculated from the calculated amount of methanol expected to be used for the steam reforming reactions, and is compared with the approximate quantity of heat produced by the oxidation reactions. In case that the quantity of heat expected to be consumed by the steam reforming reactions balances the quantity of heat produced by the oxidation reactions in a predetermined range of error, the program determines that the reforming reactions have been completed in the reformer 34. Namely it is determined that no methanol remains in the gaseous fuel output from the reformer 34. In case that the quantity of heat expected to be consumed by the steam reforming reactions exceeds the quantity of heat produced by the oxidation reactions, on the other hand, the program determines that the reforming reactions have not yet been completed in the reformer 34. In this case, it is determined that the calculated amount of methanol expected to be used for the steam reforming reactions includes the amount of methanol remaining in the gaseous fuel output from the reformer 34.

When it is determined at step S390 that the reforming reactions have been completed in the reformer 34, the program proceeds to step S380 to show the display of 'Normal Reforming' and then exits from this routine. When it is determined at step S390 that the reforming reactions have not yet been completed in the reformer 34, on the other hand, the program proceeds to step S400 to show a display of 'Decrease in Reforming Efficiency' and then exits from this routine. Like the display of 'Normal Reforming' described above, the display of 'Decrease in Reforming Efficiency' may be shown at any place where the user of the fuel-cells system 20 can readily observe. The display of 'Decrease in Reforming Efficiency' may be characters or an icon of a specific design. A sound or an alarm may be used instead of the display to enable the user to readily recognize the decrease in reforming efficiency in the reformer 34.

The determination of step S390, that is, the determination of whether or not the reforming reactions have been concluded in the reformer 34, may be carried out according to a different procedure. In accordance with one possible application, a methanol detector unit is disposed after the third catalyst layer 85 and directly measures the concentration of methanol included in the gaseous fuel output from the third catalyst layer 85. In this structure, the determination of step S390 depends upon the determination of whether or not methanol remains in the gaseous fuel.

It is desirable that the reformer 34 of the embodiment has a sufficient heat capacity. When the reforming reactions have been completed in the upstream reforming reaction unit, the resulting gaseous fuel kept in a predetermined target temperature range is supplied to the downstream reforming reaction unit. When the reformer 34 has a sufficient heat capacity, the operation of closing the flow control valve corresponding to the downstream reforming reaction unit enables the internal temperature of the downstream reforming reaction unit as well as the internal temperature of the upstream reforming reaction unit to be kept within the predetermined target temperature range.

Figure 5:
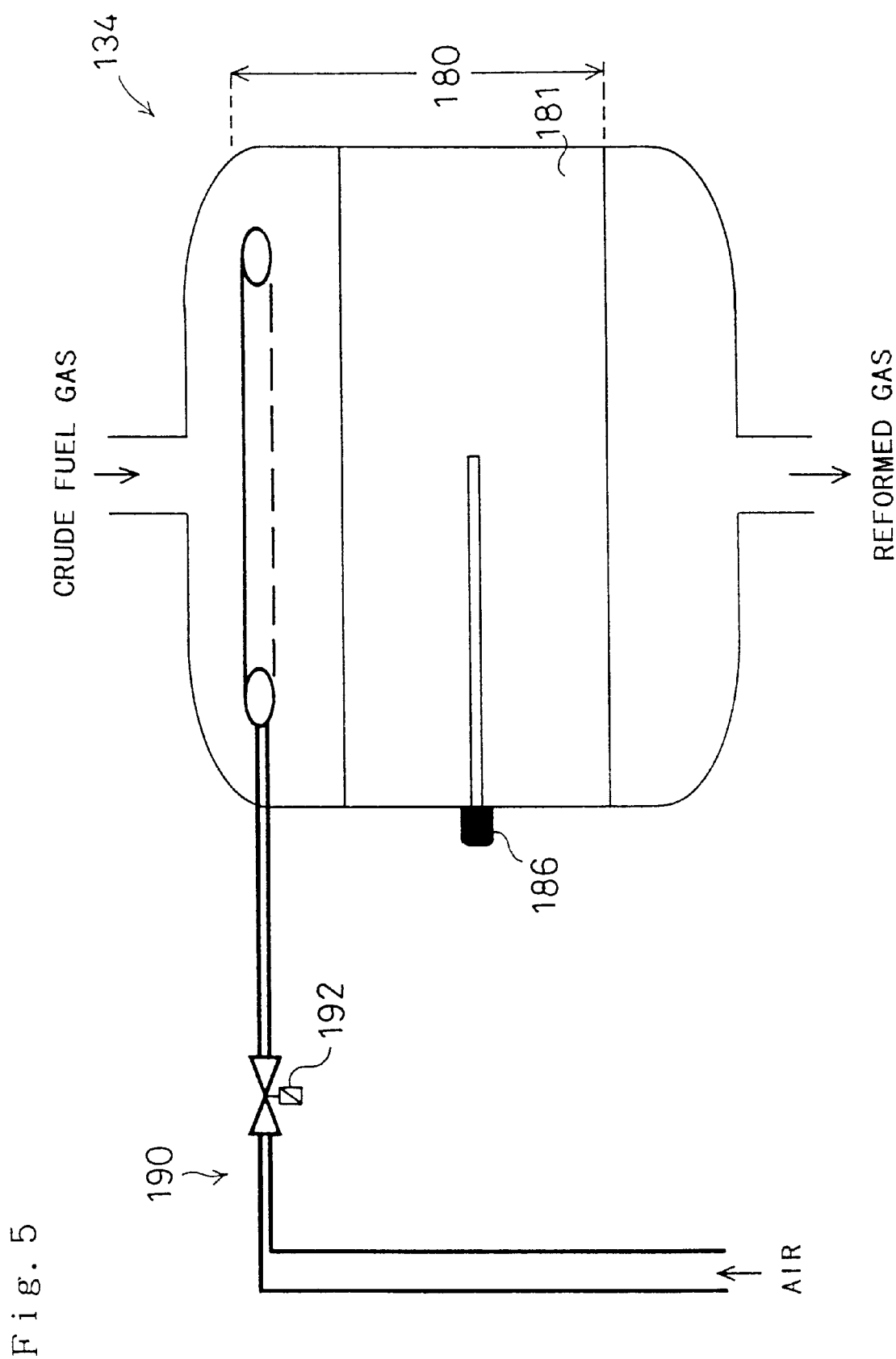
FIG. 5 illustrates structure of a conventional reformer 134 including a single catalyst layer 181.

In the fuel-cells system 20 of the embodiment thus constructed, the reformer 34 supplies the heat required for the reforming reactions therein and accordingly ensures the high energy efficiency, like the conventional reformer 134 shown in FIG. 5. The fuel-cells system 20 of this embodiment exerts the following additional effects. The reformer 34 includes a plurality of reforming reaction units, and the supply of oxygen required for the oxidation reactions is fed to the respective reforming reaction units. This structure effectively prevents the oxidation reactions from excessively proceeding in a specific area of the reformer (for example, the upstream area of the catalyst layer 181 included in the reformer 134 shown in FIG. 5) and interferes with a local increase in catalyst temperature in the reformer.

The excessive increase in catalyst temperature causes some problems, that is, deterioration of the catalyst and production of by-products as described below. The reformer 34 is filled with the CU—Zn catalyst, whose durability may be lowered at the high temperatures of approximately 300° C. and which may deteriorate by sintering at the higher temperatures. Sintering is the phenomenon of aggregating the catalyst carried on the surface of the carriers. The Cu—Zn catalyst generally includes copper fine particles dispersed on the surface of zinc particles. The sintering causes aggregation of the copper fine particles. The active area of the catalyst decreases with the decrease in surface area of the copper particles, which thereby deteriorates the performance of the reformer 34.

In the process of reforming reactions at the high temperatures, reactions other than the normal steam reforming reactions occur to produce by-products, such as methane, or gaseous nitrogen included in the supply of the compressed air reacts to produce nitrogen oxides. These by-products do not decompose in the temperature range of the reforming reactions in the reformer 34 and are fed to the fuel cells 40. An increase in amount of methane and other by-products results in lowering the hydrogen partial pressure of the gaseous fuel and is thus especially unpreferable.

In the reformer 34 of this embodiment, the supply of oxygen is fed in divisions. This structure prevents the catalyst temperature from increasing excessively in an area receiving the supply of oxygen and is free from the above problems. In the reformer 34 of this embodiment, the respective catalyst layers have small thickness along the flow of the gas. This structure enables the heat produced by the oxidation reactions to be readily transmitted to the respective catalyst layers and further equalizes the temperature distribution in the reformer 34.

In the reformer 34 of this embodiment, the internal temperature of each divisional catalyst layer is regulated separately, so that the internal temperature of the whole reformer 34 is kept in the uniform state close to the optimum temperature. This structure effectively prevents non-desired reactions from proceeding due to the local increase in temperature or prevents the activity of the reforming reactions from being lowered due to the local decrease in temperature. This accordingly enables the reforming reactions to proceed in all the catalyst layers at a high efficiency. The improvement in efficiency of the reforming reactions in all the catalyst layers ensures the progress of the reforming reactions with a less amount of the catalyst. This favorably reduces the size of the reformer and the fuel-cells system with the reformer incorporated therein.

The effect of keeping the temperature of all the catalyst layers at a desired level in the reformer 34 of this embodiment is especially desirable when the magnitude of the loading connected to the fuel cells 40 is varied. During the operation of the fuel-cells system 20, that is, during power generation in the fuel cells 40, when the magnitude of the loading connected to the fuel cells 40 is varied, controlling the on-off state of the second pump 71 changes the amount of methanol fed to the reformer 34 via the evaporator 32. Even when the amount of methanol fed to the reformer 34 is varied, execution of the catalyst temperature control routine discussed above enables the inside of the reformer 34 t be kept in the desirable temperature range and ensures the reforming reactions at a high efficiency. The reformer 34 includes a plurality of catalyst layers, and the temperature is regulated in each catalyst layer according to the catalyst temperature control routine. The division of the target of temperature control enables the temperature of each catalyst layer to be readily regulated according to the increase in supply of methanol.

When the supply of methanol decreases, no oxygen is fed to the catalyst layer arranged on the downstream side. In this case, the resulting gaseous fuel passes through the downstream catalyst layer without further progress of the reforming reactions. A substantial variation in amount of the catalyst according to the supply of methanol facilitates the temperature control in each catalyst layer and maintains the activity of the reforming reactions at a high level in the area where the reforming reactions actually proceed. While the amount of the catalyst is substantially varied, the temperatures of all the catalyst layers are kept within the predetermined target temperature range. When the number of the catalyst layers that receive the supply of oxygen is increased with an increase in supply of methanol, the reforming reactions proceed immediately at the desired temperature in the catalyst layer to which the supply of oxygen is newly fed.

The fuel-cells system 20 carries out the following operation at the starting time. At the time of starting the fuel-cells system 20, the reformer 34 has the low internal temperature. The increase in temperature of each catalyst layer increases the quantity processed by the reforming reactions in the reformer 34. At the start of the fuel-cells system 20 of this embodiment, when the user presses the predetermined start switch and instructs a start of the fuel-cells system 20, a preset small amount of methanol and a specific amount of water corresponding to the amount of methanol are respectively fed from the methanol tank 22 and the water tank 24 to the reformer 34 via the evaporator 32, while the catalyst temperature control routine is carried out.

At the time of starting the fuel-cells system 20, the evaporator 32 is quickly heated with the hot combustion gas fed from the burner 26. The evaporator 32 is thus sufficiently heated well before the internal temperature of the reformer 34 is increased, so that the crude fuel gas of sufficiently high temperatures can be supplied to the reformer 34. At the start of the fuel-cells system 20, all the heat required for the reforming reactions proceeding in the reformer 34 may be supplied from the hot crude fuel gas fed from the evaporator 32, while all the flow control valves 92, 94, and 96 are in the closed position. In this case, execution of the catalyst temperature control routine increases the amount of the crude fuel gas (the amount of methanol) fed to the reformer 34 and successively sets the flow control valves to the open position in the upstream-to-downstream sequence to activate the oxidation reactions. This increases the internal temperature of the reformer 34 to a predetermined stationary temperature.

In accordance with another structure, at the time of starting the fuel-cells system 20, a specific amount of oxygen corresponding to the preset small amount of methanol is fed from the flow control valve 92, so as to start the oxidation reactions immediately in the reformer 34. The reformer 34 may be provided with a predetermined heating unit, such as a heater. The heating unit is activated at the time of starting the fuel-cells system 20, in order to heat the reformer 34 more quickly. This structure enables the supply of gaseous fuel to be fed to the fuel cells 40 at the earlier timing when the fuel-cells system 20 starts operation.

In the fuel-cells system 20 of this embodiment, it is determined whether or not the reforming reactions have been completed at step S390 in the catalyst temperature control routine. In case that the reformer 34 is designed to include a large amount of the catalyst, which sufficiently covers the expected maximum quantity processed by the reforming reactions, it is generally not determined that the reforming reactions have not yet been concluded at step S390. When the efficiency of the reforming reactions is lowered due to the deterioration of the catalyst, it is determined at step S390 that the reforming reactions have not yet been completed. This structure of the fuel-cells system 20 of the embodiment enables the user to replace the deteriorating catalyst without delay. In the general state, the catalyst in the upstream catalyst layer that is used for a longer time period deteriorates first. In the reformer 34 of the embodiment including a plurality of catalyst layers, only the deteriorating catalyst in the upstream catalyst layer may be replaced, or alternatively the more deteriorating catalyst in the upstream catalyst layer may be exchanged with the less deteriorating catalyst in the downstream catalyst layer. This effectively saves the catalyst.

In the reformer 34 included in the fuel-cells system 20 of this embodiment, all the heat required for the reforming reactions proceeding in the reformer 34 is supplied by the heat produced by the oxidation reactions that proceed with the reforming reactions. In accordance with one possible application, all the heat required for the reforming reactions is not supplied by the oxidation reactions, but a specific heating unit is disposed in at least the upstream portion of the reformer 34 (for example, in the first catalyst layer 81) to supply part of the heat required for the reforming reactions. The progress of the oxidation reactions of methanol lowers the hydrogen partial pressure in the gaseous fuel, compared with the case in which all the methanol is subjected to the steam reforming reactions. The structure of supplying part of the heat required for the reforming reactions by the specific heating unit, however, effectively maintains the hydrogen partial pressure in the gaseous fuel. In this modified structure, the internal temperature of each divisional catalyst layer is controlled by regulating the amount of oxygen fed to the catalyst layer. This exerts the same effects as those described in the above embodiment.

The structure of the embodiment regulates the amount of the air fed to each catalyst layer, while measuring the internal temperature of the catalyst layer. One preferable structure regulates the supply of the air based on a variation in required quantity of reforming reactions, prior to the actual variation in temperature of the catalyst layer. This structure enables a required amount of oxygen to be fed to the catalyst layer prior to the actual increase in required quantity of reforming reactions and the temperature decrease of the catalyst layer. This structure thus effectively prevents the decrease in catalyst temperature and thereby the temporary decrease in reforming efficiency. The required quantity of reforming reactions may be determined in response to the direct measurement of the output of the fuel cells 40 that specifies a variation in magnitude of the loading or in response to the input of the instruction regarding the variation in loading from the user of the fuel-cells system 20. For example, when the fuel-cells system 20 is mounted on the vehicle and used as the power source for driving the vehicle, the supply of the air (the position of each flow control valve) may be determined according to the variation in power generation in the fuel cells 40 or may be corrected with the position of the accelerator and the variation in position of the accelerator per unit time in the vehicle.

Although each catalyst layer is filled with the pellets of the metal catalyst in the reformer 34 of the embodiment, each catalyst layer may be designed in a different manner. For example, the metal catalyst is carried on the surface of a honeycomb structure. In this case, the metal catalyst may be applied on the surface of the honeycomb structure, which has been coated previously with alumina. Alternatively a mixture of the grounded catalyst pellets and a predetermined binder may be applied on the honeycomb structure.

In the above embodiment, the Cu—Zn catalyst is used as the reforming catalyst, and the platinum catalyst as the oxidation catalyst. The oxidation reactions proceed with the reforming reactions expressed by Equations (4) through (6) given above in the reformer 34. In this embodiment, the platinum catalyst included in the reformer 34 ensures the sufficient progress of the oxidation reactions in the reformer 34. The Cu—Zn catalyst also has the activity of accelerating the oxidation reactions. In case that the Cu—Zn catalyst has the sufficient catalytic activity for the oxidation reactions, each catalyst layer may not have any additional oxidation catalyst but include only the Cu—Zn catalyst. Catalysts other than those used in the embodiment may be applied for the reforming catalyst and the oxidation catalyst. For example, the palladium catalyst, instead of the platinum catalyst, may be used as the oxidation catalyst. Any catalysts that have sufficient catalytic activity for the reforming reactions or sufficient catalytic activity for the oxidation reactions are applicable. It is not necessary to mix the oxidation catalyst with the reforming catalyst on all the catalyst pellets. For example, the pellets of the reforming catalyst may be mixed with the pellets with the oxidation catalyst carried thereon. The only requirement is that each catalyst layer includes the reforming catalyst and the oxidation catalyst in the well blended state.

In the above embodiment, the reformer 34 includes the three reforming reaction units respectively having the catalyst layers. The reformer 34 may, however, be divided into another number of reforming reaction units. Although the reformer 34 has a single chamber that is divided into three divisions in the above embodiment, the reformer may include three separate chambers with catalyst layers respectively included therein. The principle of the present invention is also applicable to this structure, which thus sufficiently keeps the temperature in each chamber and between the separate chambers and regulates the supply of oxygen based on the internal temperature of each catalyst layer.

In the embodiment discussed above, the progress of the reforming reactions in each reforming reaction unit is determined according to the internal temperature of the reforming reaction unit, that is, the internal temperature of each catalyst layer. The progress of the reforming reactions in each reforming reaction unit may, however, be determined according to data other than the internal temperature of each catalyst layer. The available data include the temperature of the gas output from each reforming reaction unit (that is, the gas in the course of the reforming reactions) and the composition of the gas output from each reforming reaction unit. In the latter case, an analyzing device is disposed after each catalyst layer to analyze the composition of the gas flowing through the reformer. The progress of the reforming reactions is then determined according to the amounts of methanol, hydrogen, and carbon dioxide included in the gas output from each catalyst layer, and is utilized to regulate the amount of the air fed to each catalyst layer. One preferable modification combines the information regarding the composition of the gas with the information regarding the internal temperature of each catalyst layer to determine the progress of the reforming reactions in each reforming reaction unit. This structure enables each reforming reaction unit to be controlled to a desired state with a higher accuracy.

In the above embodiment, methanol is used as the crude fuel and converted to the hydrogen-rich gaseous fuel through the reforming reactions. Among the hydrocarbons available as the crude fuel, methanol can be subjected to the steam reforming reactions under relatively mild conditions. Application of methanol for the crude fuel thus reduces the size of the fuel reforming apparatus, which is especially advantageous when the fuel-cells system is used as the power source for driving the vehicle. The principle of the present invention is, however, applicable to the fuel reforming apparatuses that convert other hydrocarbon fuels through the reforming reactions.

In one example, the natural gas is used as the crude fuel. The primary component of the natural gas is methane, which is subjected to the reforming reactions shown below. Equation (8) shows the decomposition reaction of methane in the process of steam reforming methane. Equations (9) and (10) respectively show the oxidation reaction of carbon monoxide and the oxidation reaction of hydrogen proceeding by the addition of oxygen in the course of the reforming reactions.

$$CH_4 + H_2O \rightarrow CO + 3H_2 - 206.2 (kJ/mol) \tag{8}$$

$$CO + (\tfrac{1}{2})O_2 \rightarrow CO_2 + 279.5 (kJ/mol) \tag{9}$$

$$H_2 + (\tfrac{1}{2})O_2 \rightarrow H_2O + 240 (kJ/mol) \tag{10}$$

In the process of steam reforming methane, methane is first decomposed by the endothermic reaction expressed by Equation (8) given above. Methane reacts with water (steam) to produce carbon monoxide and hydrogen. Carbon monoxide evolved here reacts with water according to the shift reaction expressed by Equation (5) to produce carbon dioxide and hydrogen, or reacts with the supply of oxygen to produce carbon dioxide according to the oxidation reaction expressed by Equation (9). Part of hydrogen produced by the decomposition reaction of methane expressed by Equation (8) is subjected to the oxidation reaction shown by Equation (10) to produce water. Water produced by the oxidation reaction of Equation (10) is used for the decomposition reaction of methane shown by Equation (8) or the shift reaction of Equation (5) for oxidizing carbon monoxide. Methane is eventually converted to the hydrogen-rich gas containing carbon dioxide through these reactions. These reactions may be accelerated by a nickel catalyst.

In the process of the reforming reactions of methanol as the crude fuel in the presence of oxygen, the heat required for the endothermic reforming reaction is supplied by the heat produced by the exothermic oxidation reaction. In the process of the reforming reactions of methane as the crude fuel, on the other hand, the endothermic decomposition reaction of methane occurs at the first step. The heat required for the endothermic reaction can thus not be supplied by the heat produced by the exothermic reaction. In this case, the crude fuel gas including methane is sufficiently heated in the evaporator before being led to the reformer. This structure enables the decomposition reaction of methane expressed by Equation (8) to start with the heat of the hot crude fuel gas in the reformer. The start of the decomposition reaction of methane expressed by Equation (8) immediately activates the shift reaction of Equation (5) and the oxidation reactions of Equations (9) and (10), which are exothermic and supply the heat. The decomposition reaction of Equation (8) then proceeds with the supply of heat. In this manner, the crude fuel can be converted through the reforming reactions, while the heat produced by the exothermic reactions well balances the heat absorbed by the endothermic reaction in the reformer.

As described above, when the methane used as the crude fuel is converted into the hydrogen-rich gaseous fuel through the steam reforming reactions, the supply of oxygen to the reformer activates the exothermic oxidation reactions and enables the heat required for the endothermic decomposition reaction to be supplied by the heat produced by the exothermic oxidation reactions. Like the reformer 34 of the above embodiment, application of the structure using methane as the crude fuel to the fuel reforming apparatus of the present invention improves the energy efficiency of the fuel reforming apparatus and ensures the effective use of the catalyst to attain the high efficiency of the reforming reactions. Regulation of the amount of oxygen fed to the reformer causes the fuel-cells system not to require any external heat source for heating the reformer. A heat source may, however, be disposed at the inlet of the reformer to accelerate the decomposition reaction of methane expressed by Equation (8). When the city gas is used as the crude fuel, a purifier is located before the reformer to remove organic sulfur oxides added to the city gas as an odorant.

The principle of the present invention is applicable to the other crude fuels, such as LP gas (where the hydrocarbon component used as the crude fuel is propane), gasoline (where the crude fuel component is n-octane or isooctane), and light oil (where the crude fuel component is n-cetane), as well as the natural gas (where the crude fuel component is methane). Like the embodiment discussed above, application of the present invention to these crude fuels improves the energy efficiency and the reforming efficiency.

In the above embodiment, the gaseous fuel obtained by the reforming reactions is used in the polymer electrolyte fuel cells. The method and the fuel reforming apparatus of the present invention are also applicable to the fuel-cells system including other types of fuel cells that can use the reformed gas as the gaseous fuel, such as phosphate fuel cells. In the fuel-cells system including another type of fuel cells and the fuel reforming apparatus of the present invention, even when the quantity processed by the fuel reforming apparatus is varied with a variation in loading connected to the fuel cells, the fuel reforming apparatus can keep the high reforming efficiency. Especially when the fuel cells are used as a portable power source, application of the present invention favorably simplifies the structure of the whole system.

The present invention is not restricted to the above embodiment or its modifications, but there may be many other modifications, changes, and alterations without departing from the scope or spirit of the main characteristics of the present invention.

It should be clearly understood that the above embodiment is only illustrative and not restrictive in any sense. The scope and spirit of the present invention are limited only by the terms of the appended claims.

What is claimed is:

1. A fuel reforming apparatus which converts a hydrocarbon included in a crude fuel gas to hydrogen through an endothermic reforming reaction and discharges a gaseous fuel containing the hydrogen, said fuel reforming apparatus comprising:
    a reformer comprising a plurality of reforming reaction units, each reforming reaction unit having a reforming catalyst, which accelerates the reforming reaction, and an oxidation catalyst, which accelerates an exothermic oxidation reaction in the presence of oxygen;
    a crude fuel supply unit which feeds a supply of the crude fuel gas to said reformer, so as to cause the supply of the crude fuel gas to successively pass through said plurality of reforming reaction units;
    a progress detection unit which detects a progress of the reforming reaction in each of said plurality of reforming reaction units;
    an oxygen supply unit which feeds a supply of oxygen to each of said plurality of reforming reaction units to make the oxidation reaction proceed; and
    an oxygen supply regulation unit which regulates an amount of oxygen fed to said each reforming reaction unit via said oxygen supply unit, based on the progress of the reforming reaction detected by said progress detection unit,
    wherein said oxygen supply unit individually regulates an amount of oxygen fed to each of said plurality of reforming reaction units, and said oxygen supply regulating unit individually controls an amount of oxygen fed to each reforming reaction unit based on the detected progress of the reforming reaction in each of the plurality of reforming reaction units.

2. A fuel reforming apparatus in accordance with claim 1, wherein said progress detection unit detects the progress of the reforming reaction in each of said plurality of reforming reaction units, based on an internal temperature of said each reforming reaction unit, and
    said oxygen supply regulation unit regulates the amount of oxygen fed to said each reforming reaction unit, in order to keep the internal temperature of said each reforming reaction unit in a predetermined temperature range.

3. The fuel reforming apparatus in accordance with claim 1, wherein said oxygen supply unit individually regulates an amount of oxygen fed to each of said plurality of reforming reaction units, and said oxygen supply regulating unit individually controls an amount of oxygen fed to each reforming reaction unit based on the detected progress of the reforming reaction in each of the plurality of reforming reaction units.

4. A fuel-cells system comprising a fuel reforming apparatus, which converts a hydrocarbon included in a crude fuel gas to hydrogen through an endothermic reforming reaction and discharges a gaseous fuel containing the hydrogen, and a fuel cell, which receives a supply of the gaseous fuel produced by said fuel reforming apparatus to generate electricity, said fuel reforming apparatus comprising:
    a reformer comprising a plurality of reforming reaction units, each reforming reaction unit having a reforming catalyst, which accelerates the reforming reaction, and an oxidation catalyst, which accelerates an exothermic oxidation reaction in the presence of oxygen;
    a crude fuel supply unit which feeds a supply of the crude fuel gas to said reformer, so as to cause the supply of the crude fuel gas to successively pass through said plurality of reforming reaction units;

a progress detection unit which detects a progress of the reforming reaction in each of said plurality of reforming reaction units;

an oxygen supply unit which feeds a supply of oxygen to each of said plurality of reforming reaction units to make the oxidation reaction proceed; and an oxygen supply regulation unit which regulates an amount of oxygen fed to said each reforming reaction unit via said oxygen supply unit, based on the progress of the reforming reaction detected by said progress detection unit, wherein said oxygen supply unit individually regulates an amount of oxygen fed to each of said plurality of reforming reaction units, and said oxygen supply regulating unit individually controls an amount of oxygen fed to each reforming reaction unit based on the detected progress of the reforming reaction in each of the plurality of reforming reaction units.

5. A fuel-cells system in accordance with claim 4, wherein said progress detection unit detects the progress of the reforming reaction in each of said plurality of reforming reaction units, based on an internal temperature of said each reforming reaction unit, and said oxygen supply regulation unit regulates the amount of oxygen fed to said each reforming reaction unit, in order to keep the internal temperature of said each reforming reaction unit in a predetermined temperature range that enhances activity of the reforming reaction proceeding in said each reforming reaction unit.

6. The fuel reforming apparatus in accordance with claim 4, wherein said oxygen supply unit individually regulates an amount of oxygen fed to each of said plurality of reforming reaction units, and said oxygen supply regulating unit individually controls an amount of oxygen fed to each reforming reaction unit based on the detected progress of the reforming reaction in each of the plurality of reforming reaction units.

7. A fuel reforming apparatus which converts a hydrocarbon included in a crude fuel gas to hydrogen through an endothermic reforming reaction and discharges a gaseous fuel containing the hydrogen, said fuel reforming apparatus comprising:

a reformer comprising a plurality of reforming reaction units, each reforming reaction unit having a reforming catalyst, which accelerates the reforming reaction, and an oxidation catalyst, which accelerates an exothermic oxidation reaction in the presence of oxygen;

a crude fuel supply unit which feeds a supply of the crude fuel gas to said reformer, so as to cause the supply of the crude fuel gas to successively pass through said plurality of reforming reaction units;

a progress detection unit which detects a progress of the reforming reaction in each of said plurality of reforming reaction units;

an oxygen supply unit which feeds a supply of oxygen to each of said plurality of reforming reaction units to make the oxidation reaction by said oxidation catalyst proceed and individually regulates an amount of oxygen fed to each of said plurality of reforming reaction units; and an oxygen supply control unit which individually controls an amount of oxygen fed to said each reforming reaction unit via said oxygen supply unit; based on the progress of the reforming reaction in each of the plurality of reforming reaction units, which is detected by said progress detection unit.

8. A fuel reforming apparatus in accordance with claim 7, wherein said progress detection unit detects the progress of the reforming reaction in each of said plurality of reforming reaction units, based on an internal temperature of said each reforming reaction unit, and said oxygen supply control unit which individually controls the amount of oxygen fed to said each reforming reaction unit, in order to keep the internal temperature of said each reforming reaction unit in a predetermined temperature range.

9. A fuel reforming apparatus in accordance with claim 7, wherein said oxygen supply control unit controls the amount of oxygen to be fed to the reforming reaction units, starting with an upstream reforming reaction unit in a direction of flow of the crude fuel gas through the plurality of reforming reaction units and continuing sequentially to a downstream reforming reaction unit.

10. A fuel reforming apparatus in accordance with claim 9, wherein said oxygen supply control unit, when controlling the amount of oxygen to be fed to a reforming reaction unit, ends the control of the oxygen amount and keeps the oxygen amount when the internal temperature of said reforming reaction unit is in a predetermined temperature range, and starts controlling the amount of oxygen to be fed to another reforming reaction unit that adjoins to said reforming reaction unit and is situated downstream of said reforming reaction unit.

11. A fuel reforming apparatus in accordance with claim 9, wherein said oxygen supply control unit, when controlling the amount of oxygen to be fed to a reforming reaction unit, ends the control of the oxygen amount when the internal temperature of said reforming reaction unit is in a predetermined temperature range, and when the oxygen amount is equal to zero, controls the amount of oxygen to be fed to another reforming reaction unit that is situated in the lower course of the stream than said reforming reaction unit to be zero.

12. A fuel cell system comprising a fuel reforming apparatus which converts a hydrocarbon included in a crude fuel gas to hydrogen through an endothermic reforming reaction and discharges a gaseous fuel containing the hydrogen, and a fuel cell, which receives a supply of the gaseous fuel produced by said fuel reforming apparatus to generate electricity, said fuel reforming apparatus comprising:

a reformer comprising a plurality of reforming reaction units, each reforming reaction unit having a reforming catalyst, which accelerates the reforming reaction, and an oxidation catalyst, which accelerates an exothermic oxidation reaction in the presences of oxygen;

a crude fuel supply unit which feeds a supply of the crude fuel gas to said reformer, so as to cause the supply of the crude fuel gas to successively pass through said plurality of reforming reaction units;

a progress detection unit which detects a progress of the reforming reaction in each of said plurality of reforming reaction units;

an oxygen supply unit which feeds a supply of oxygen to each of said plurality of reforming reaction units to make the oxidation reaction by said oxidation catalyst proceed and individually regulates an amount of oxygen fed to each of said plurality of reforming reaction units; and an oxygen supply control unit which individually controls an amount of oxygen fed to said each reforming reaction unit via said oxygen supply unit, based on the progress of the reforming reaction in each of the plurality of reforming reaction units, which is detected by said progress detection unit.

13. A fuel cell system in accordance with claim 12, wherein said progress detection unit detects the progress of the reforming reaction in each of said plurality of reforming reaction units, based on an internal temperature of said each reforming reaction unit, and said oxygen supply control unit individually controls the amount of oxygen fed to said each reforming reaction unit, in order to keep the internal temperature of said each reforming reaction unit in a predetermined temperature range that enhances activity of the reforming reaction proceeding in said each reforming reaction unit.

14. A fuel cell system in accordance with claim 13, wherein said oxygen supply control unit controls the amount of oxygen to be fed to the reforming reaction units, starting with an upstream reforming reaction unit in a direction of flow of the crude fuel gas through the plurality of reforming reaction units and continuing sequentially to a downstream reforming reaction unit.

15. A fuel cell systems in accordance with claim 14, wherein said oxygen supply control unit, when controlling the amount of oxygen to be fed to a reforming reaction unit, ends the control of the oxygen amount and keeps the oxygen amount when the internal temperature of said reforming reaction unit is in a predetermined temperature range, and starts controlling the amount of oxygen to be fed to another reforming reaction unit that adjoins to said reforming reaction unit and is situated downstream of said reforming reaction unit.

16. A fuel cell system in accordance with claim 14, wherein said oxygen supply control unit, when controlling the amount of oxygen to be fed to a reforming reaction unit, ends the control of the oxygen amount when the internal temperature of said reforming reaction unit is in a predetermined temperature range, and when the oxygen amount is equal to zero, controls the amount of oxygen to be fed to another reforming reaction unit that is situated in the lower course of the stream than said reforming reaction unit to be zero.

\* \* \* \* \*